Patented July 20, 1954

2,684,295

UNITED STATES PATENT OFFICE 2,684,295

CHARCOAL FERTILIZER COMPOSITIONS

William H. Eyster, Emmaus, Pa., assignor to Eastern States Soilbuilders, Inc., Sharpsburg, Md., a corporation of Maryland No Drawing. Application May 14, 1951, Serial No. 226,291

8 Claims. (Cl. 71—17)

This invention relates to new and improved fertilizer compositions. More specifically, it relates to insoluble fertilizer compositions containing activated charcoal.

To be available for absorption and utilization by plants, soil nutrients must be in solution. Many potential fertilizers, because of their substantial insolubility, must be subjected to solubilization treatments, as for example, the treatment of rock phosphate with sulfuric acid to form the more soluble superphosphates. Such treatments increase the cost of the fertilizers considerably. Furthermore, the solubilizing reagents, such as sulfuric acid, may be highly corrosive. Insoluble pulverized rock fertilizers added to the soil are eventually solubilized by acids in the soil produced largely by soil organisms in the course of their metabolic action on organic matter or humus, and by the base exchange action of humus, but the rate of solubility is excessively slow. If appreciable amounts of humus are absent from the soil with accompanying inhibition of soil organism activity, the rock fertilizer remains substantially insoluble and unavailable to plants.

Sources of organic nitrogen such as blood meal, tankage, cotton seed meal and the like, also serve as valuable plant nutrients, particularly as a source of nitrogen. However, these substantially insoluble organic nitrogen compositions are made available for plant utilization very slowly by the decomposition action of soil organisms.

The object of this invention is to provide insoluble fertilizer compositions containing a component, namely, activated charcoal, which renders the insoluble fertilizer available for utilization at a rate which is entirely sufficient for plant requirements.

Another object is to provide compositions containing insoluble rock fertilizers which are available for plant utilization despite the absence of humus in the soil.

Still another object is to accelerate the rate at which insoluble organic nitrogen containing fertilizers become available for plant utilization by incorporating activated charcoal in said fertilizer compositions.

Another object is to provide insoluble fertilizer compositions, a single application of which provides plants with available essential nutrients for an extended period of time at an efficient and effective rate.

Other objects and advantages of my invention will become apparent from the following detailed description.

I have discovered that when activated charcoal is incorporated into an insoluble mineral fertilizer, such as pulverized rock phosphate, glauconite and the like, it makes the fertilizer rapidly available to plants. This is due largely to the base exchange properties of the activated charcoal and also to its gas occlusion properties.

The activated charcoal carries into the soil large volumes of occluded oxygen which is needed by the soil organisms. The amount of occluded oxygen may be maximized by impregnating the charcoal with air prior to use. By reducing the water inhibition forces in the soil, the charcoal also improves moisture conditions, making it more readily utilizable by the plants and the soil organisms. As a result the metabolic activities of the soil organisms are greatly accelerated and they act on organic matter in the soil or such organic matter as may be included in the insoluble fertilizer compositions to form increased amounts of organic acids, nitrous oxide, carbon dioxide, nitrites, nitrates, etc. which are adsorbed by the charcoal. The charcoal also occludes appreciable amounts of water which dissolves and holds the gaseous products, such as carbon dioxide in the form of acids.

The increased quantities of available acids react with and solubilize the insoluble mineral fertilizers. The charcoal also acts as a base exchange medium, exchanging cations, such as $H^+$ ions of the occluded acids, for the cations of the mineral fertilizer, such as $Ca^{++}$ of rock phosphate and $K^+$, $Mg^{++}$, $Fe^{++}$, etc. of glauconite. These essential minerals are then made available to the plant roots by the charcoal by a base-exchange relationship.

The base-exchange between the activated charcoal and the insoluble mineral fertilizer, such as phosphate rock, also results in a solubilizing of the rock, as for example, by the formation of phosphoric acid which thus becomes available for absorption by the plants roots.

Ordinarily, insoluble minerals such as rock phosphate, are eventually made available to plants by the base-exchange properties of humus in the soil and soil acids produced by soil organisms. This action is excessively slow, and, therefore, cannot be relied upon to produce satisfactory nutritional results. However, if no appreciable amounts of organic matter or humus are present in the soil, even this slow solubilizing of the insoluble mineral fertilizer is absent.

I have found that the activated charcoal added to the insoluble mineral fertilizer provides a substitute for organic matter in the soil which is much more efficient in its base exchange properties than the latter. In the absence of organic matter or humus in the soil with its consequent inhibition of soil organism activity, the charcoal utilizes for base-exchange the acids released by the metabolic activities of plants and such soil inhabitants as earthworms, insect life, and the like, especially carbon dioxide in the form of carbonic acid. The charcoal occludes large amounts of the carbon dioxide gas which ordinarily would be lost to the atmosphere.

Although chemical solubilization of insoluble mineral fertilizers prior to soil application undoubtedly permits their most rapid utilization by the plants this possesses several serious disadvantages. Unless carefully applied under restricted favorable conditions, the soluble fertilizers such as superphosphate may cause severe burning. They are frequently corrosive due to hydrolysis of salts, such as calcium sulphate, formed by the solubilization treatment with acids such as sulfuric acid. They remain available to the plants only for a relatively short time since they are quickly washed away. Furthermore, their cost is relatively high.

The insoluble mineral fertilizers containing activated charcoal are non-corrosive, may be applied under any conditions without causing burning of the foliage and are inexpensive. Furthermore, since they are not leached away, they remain in close proximity to the plant roots and they provide a steady supply of essential nutrients at a sufficiently rapid rate for plant needs over an extended period of time so that repeated application is unnecessary.

I have also discovered that activated charcoal greatly accelerates the conversion of the insoluble organic fertilizers employed largely as a source of nitrogen, such as blood meal, cottonseed meal, tankage, and the like, into the simpler products utilized by plants. This is accomplished to a large extent as a result of the large volume of oxygen occluded by the charcoal which steps up the activity of the soil organisms essential for the decomposition of the organic matter. In addition, the activated charcoal appears to exert a marked catalytic effect which accelerates the oxidative reactions involved in the decomposition of the organic fertilizer. Furthermore, the charcoal, by occluding the gaseous decomposition products and thus preventing loss to the atmosphere, conserves them for use by the plants and soil organisms.

The activated charcoal may be incorporated into the fertilizer in any desired amount. A minor proportion, however, is generally amply sufficient since the charcoal in effect acts as an activator or catalyst, thus retaining its identity and effectiveness indefinitely. In general, I have found that about 2 to 10% of activated charcoal gives highly effective results, but more or less may be used as desired depending to some extent upon the condition of the soil. In the case of a low humus content soil, somewhat increased proportions of charcoal may be advantageous.

The following examples show illustrative formulations of insoluble fertilizer compositions containing activated charcoal which are very effective. However, it will be understood that the ingredients employed are by way of example, only, and that the proportions may be varied in any desired manner.

*Example I*

| | Per cent |
|---|---|
| Pulverized phosphate rock | 97½ |
| Pulverized activated charcoal | 2½ |

*Example II*

| | Per cent |
|---|---|
| Pulverized glauconite | 97½ |
| Pulverized activated charcoal | 2½ |

*Example III*

| | Per cent |
|---|---|
| Pulverized phosphate rock | 47½ |
| Pulverized glauconite | 50 |
| Pulverized activated charcoal | 2½ |

*Example IV*

| | Per cent |
|---|---|
| Blood meal | 97½ |
| Pulverized activated charcoal | 2½ |

*Example V*

| | Per cent |
|---|---|
| Pulverized phosphate rock | 45 |
| Pulverized glauconite | 41¼ |
| Blood meal | 11¼ |
| Pulverized activated charcoal | 2½ |

Although this invention has been described with reference to illustrative embodiments thereof, it will be apparent to those skilled in the art that the principles of this invention may be embodied in other forms but within the scope of the appended claims.

Having thus described my invention, I claim:

1. A fertilizer composition comprising insoluble mineral fertilizer in admixture with activated charcoal having substantial ion-exchange properties, said charcoal comprising about 2 to 10% of said composition, the ion-exchange properties of said activated charcoal serving to make said insoluble mineral fertilizer available for plant utilization.

2. A fertilizer composition comprising a major proportion of insoluble mineral fertilizer in admixture with at least about 2% activated charcoal having substantial ion-exchange properties, the ion-exchange properties of said activated charcoal serving to make said insoluble mineral fertilizer available for plant utilization.

3. A fertilizer composition comprising a major proportion of pulverized rock phosphate in admixture with at least about 2% activated charcoal having substantial ion-exchange properties, the ion-exchange properties of said activated charcoal serving to make said rock phosphate available for plant utilization.

4. A fertilizer composition comprising a major proportion of pulverized glauconite in admixture with at least about 2% activated charcoal having substantial ion-exchange properties, the ion-exchange properties of said activated charcoal serving to make said glauconite available for plant utilization.

5. A fertilizer composition comprising pulverized rock phosphate and pulverized glauconite, said phosphate and glauconite being present in major proportion, in admixture with at least about 2% activated charcoal having substantial ion-exchange properties, the ion-exchange properties of said activated charcoal serving to make said rock phosphate and said glauconite available for plant utilization.

6. A fertilizer composition comprising pulverized rock phosphate, pulverized glauconite and blood meal in admixture with activated charcoal having substantial ion-exchange properties, said charcoal comprising about 2 to 10% of said composition, the ion-exchange properties of said activated charcoal serving to make said rock phosphate, glauconite and blood meal available for plant utilization.

7. A method for providing nutrients to plants which comprises admixing at least about 2% activated charcoal having substantial ion-exchange properties with a major proportion of insoluble mineral fertilizer, and adding said composition to soil, the ion-exchange properties of the charcoal serving to make the insoluble mineral fertilizer available for plant utilization.

8. A method for providing nutrients to plants which comprises admixing at least about 2% activated charcoal having substantial ion-exchange properties with a major proportion of insoluble mineral fertilizer selected from the group consisting of rock phosphate and glauconite, and adding said composition to soil, the ion-exchange properties of the charcoal serving to make the insoluble mineral fertilizer available for plant utilization.

References Cited in the file of this patent

UNITED STATES PATENTS

| Number | Name | Date |
|---|---|---|
| 74,799 | Commins | Feb. 25, 1868 |
| 155,517 | Huch | Sept. 29, 1874 |
| 382,604 | Goodale | May 8, 1888 |
| 522,561 | Gulick | July 3, 1894 |
| 847,749 | Ellis | Mar. 19, 1907 |
| 1,917,680 | Witt | July 11, 1933 |
| 2,048,658 | Jannek | July 21, 1936 |
| 2,171,408 | Smit | Aug. 29, 1939 |
| 2,310,652 | Peter | Feb. 9, 1943 |

FOREIGN PATENTS

| Number | Country | Date |
|---|---|---|
| 409,658 | Great Britain | Apr. 30, 1934 |

OTHER REFERENCES

Mantell—Industrial Carbon—Sec. Ed. (1946), D. Van Nostrand Co., N. Y., pages 104, 107.